Dec. 10, 1946. J. R. MACINTYRE 2,412,461
SYNCHRONOUS MOTOR
Filed May 25, 1945 2 Sheets-Sheet 1

Inventor:
John R. Macintyre,
by Harry E. Dunham
His Attorney.

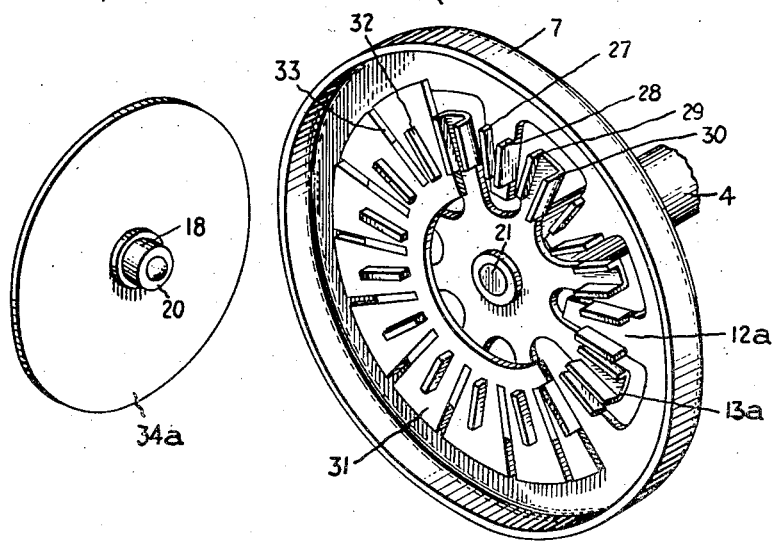
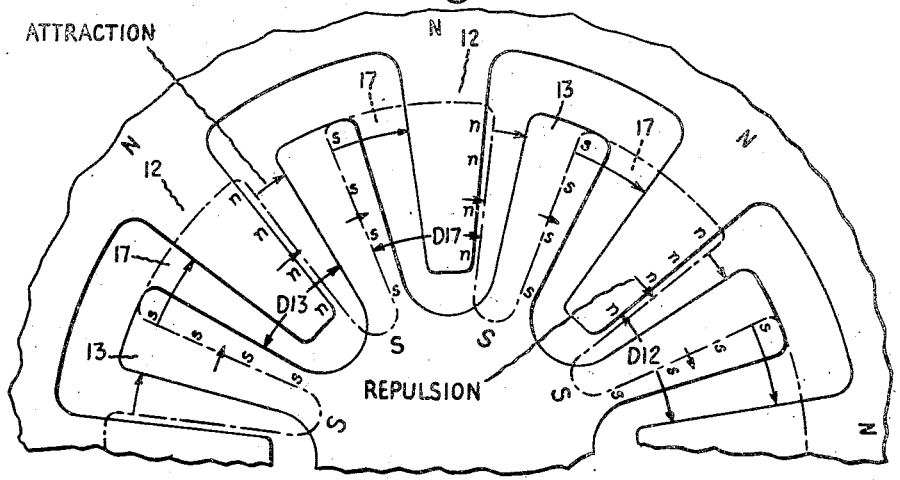

Patented Dec. 10, 1946

2,412,461

UNITED STATES PATENT OFFICE 2,412,461

SYNCHRONOUS MOTOR

John R. Macintyre, South Peabody, Mass., assignor to General Electric Company, a corporation of New York Application May 25, 1945, Serial No. 595,723

9 Claims. (Cl. 172—278)

My invention relates to synchronous motors and is suitable for use in the construction of small motors such as are used for driving timing devices. One object of the invention is the design of such a motor in which there is high utilization of the material in the rotor and a high utilization of the radial space occupied by adjacent stator and rotor parts for the production of torque. In the usual motor the torque producing pole piece parts of stator and rotor are located in concentric circles separated by an air gap, and the rotor structure lying between its pole pieces and the axis of rotation is used merely as supporting structure. In accordance with my invention the active torque producing pole pieces of both stator and rotor are positioned in spaced parallel planes perpendicular to the axis of rotation and utilize a very substantial portion of the entire radial space between the axis of rotation and the periphery of the rotor. By such an arrangement the available torque producing surfaces of stator and rotor for a motor of given external dimensions may be appreciably increased with a corresponding increase in the ratio of motor output to motor size. Other advantageous features of my invention will be mentioned as the description proceeds.

Figure 1:
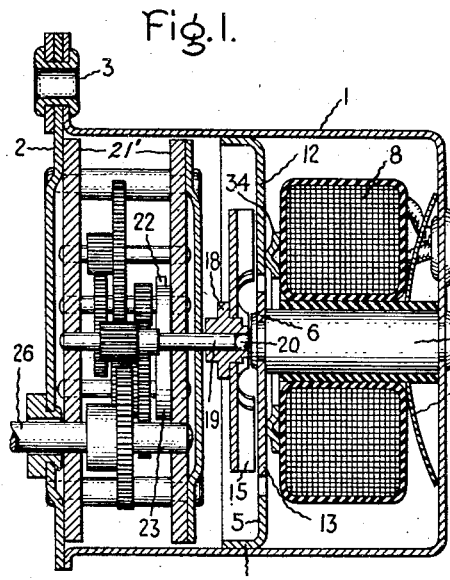
Figure 2:
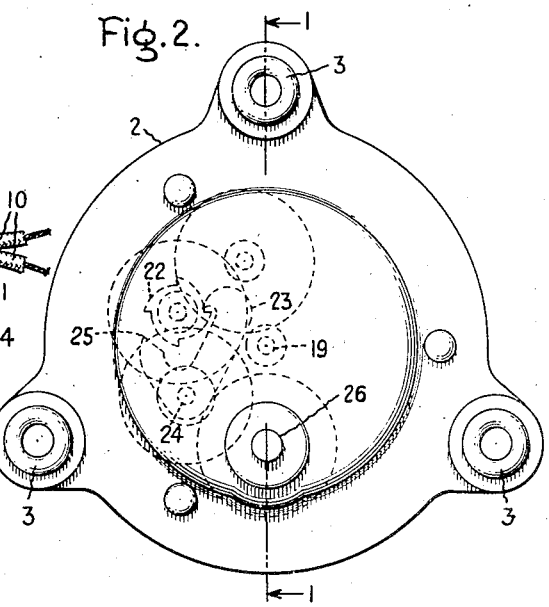
Figure 3:
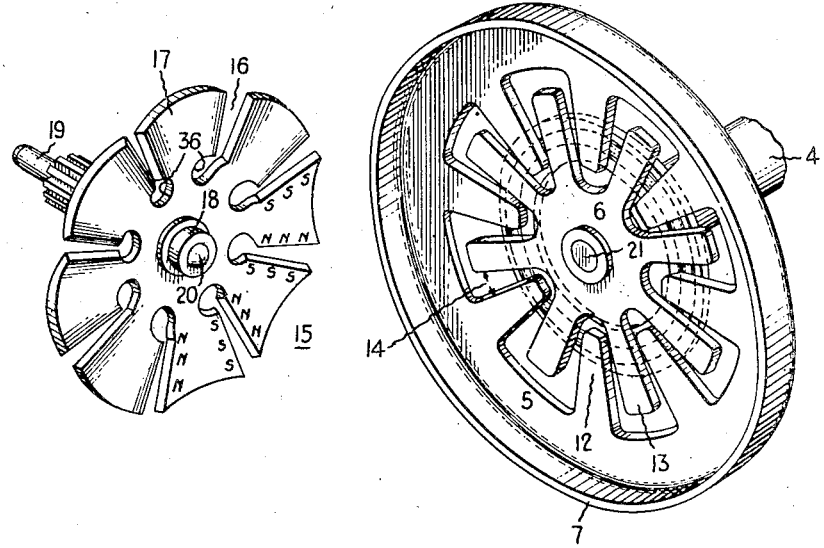

The features of the invention which are believed to be novel and patentable will be pointed out in the claims appended hereto. For a better understanding of my invention, reference is made in the following description to the accompanying drawings in which Fig. 1 shows a cross-sectional view of my improved motor as constructed with a suitable gear reduction and supporting casing. Fig. 2 represents an end view of such a motor with a one-way clutch included in the gear reduction unit represented in dotted lines. Fig. 3 represents an exploded perspective view of the rotor and stator pole piece assemblies of the motor of Fig. 1, Fig. 4 is a perspective view of a shaded pole form of stator pole piece assembly that may be used and Fig. 5 is a schematic illustration of the overlapping tooth relationship of stator and rotor in a given torque position.

I will refer first to the form of motor represented in Figs. 1 to 3 wherein like parts are indicated by like reference characters. The casing may comprise a magnetic cup part 1 with an end closure 2, these parts being riveted together at their rims by hollow rivets 3 which may then serve as screw or bolt holes for securing the motor assembly to other apparatus. The motor stator magnetic circuit includes the right portion of the cup member 1 as shown in Fig. 1, a central magnetic core 4, and outer and inner stator magnetic pole piece sections 5 and 6, in the same radial plane. The outer pole piece section 5 may be mechanically secured to the inner pole piece section 6, by means of the nonmagnetic ring 34, which is welded to both pole piece sections. This welded assembly may be magnetically secured to and within cup 1 by a close fit at their contacting surfaces, the outer periphery of section 5 having a bent-over rim section 7 to facilitate this. The welded assembly of the inner stator pole piece section 6 and outer pole piece section 5 is staked to the inner end of core 4, and the opposite end of the core is staked to the center of the end of cup 1. A coil 8 surrounds the core 4 and is housed within the magnetic parts described as shown. A dish-shaped spring washer 9 holds the coil firmly in place so that it cannot rattle. Provision is made for exciting coil 8 from an alternating current circuit by leads 10 brought out through a bushing 11 in the end wall of member 1. The electrical resistance of the washer 9 and the metal ring 34 are such as to limit the power loss due to circulating currents to a minimum. If necessary this can be accomplished by suitable slotting to increase the length and hence the resistance of the circulating current path.

The pole piece sections 5 and 6 have interleaved fingers or pole pieces 12 and 13, respectively. In the example shown there are eight pole pieces in each section, the pole pieces 13 of the inner section 6 extending radially outward between inwardly extending radial pole pieces 12 in the outer section 5 in the same plane. The air gaps 14 between the pole pieces 12 and 13 are radially symmetrical and are somewhat greater near the periphery than near the center. The teeth or pole pieces 13 are slightly wider at their outer ends than at their inner ends and the teeth 12 are approximately twice as wide at the outer ends as at their inner ends. The radial gap at the ends of the teeth are made at least as large as the greatest width of the peripheral gap. The gaps between the stator pole pieces are sufficient to prevent any appreciable leakage flux directly between these pole pieces in the operation of the motor, and the generally sector shaped pole pieces and gaps are otherwise dimensioned with a view of avoiding saturation at any point and of obtaining a maximum useful torque flux.

The rotor 15 shown at the left in Fig. 3 is essentially a disk with eight radial slots 16 forming eight radial pole piece sectors 17. The rotor is rotatively mounted with a bushing 18 and a shaft 19 on the center axis of the casing and motor stator and is positioned closely adjacent to the plane of the stator pole pieces with a sufficiently small intervening axial air gap to cause the greater part of the flux which passes between the stator pole pieces to do so through the rotor. A thrust bearing for the rotor shaft at the core end comprises a steel ball 20 fixed in the center of housing 18 against the end of shaft 19 and bears against a suitable bearing surface 21 inserted in the adjacent end of the core piece. This bearing surface 21 may be a small piece of fabricated plastic material such as is sold under the trade-mark Textolite. The shaft 19 is otherwise supported for rotation in bearings in plates 21' which are riveted together in spaced relation and support the gear reduction unit for the motor securely in the left end of the housing as viewed in Fig. 1. The rotor sectors 17 may be bent slightly as represented so as to bring their radial edges slightly closer to the stator pole pieces than the intermediate portions of the sectors. This assures a small motor air gap with sufficient clearance at the axis to accommodate the thrust bearing 20 and also makes the rotor more difficult to demagnetize.

To facilitate the manufacture of the rotor sectors 17 and their proper alignment with the stator pole pieces, the inner ends of the slots 16 may terminate in enlarged drill holes 36. In the form of synchronous motor represented in Figs. 1 to 3 the rotor is preferably made of permanent magnet material, such as the copper-nickel-cobalt alloy described in United States Letters Patent No. 2,170,047 to Dannöhl et al., and is polarized in a peripheral direction to have poles of opposite polarity facing themselves across the radial slots 16 at the edges of the sectors as indicated by the polarity marks on certain of the rotor sectors in Fig. 3. The radial length of the sectors 17 conforms to the radial length of active stator pole pieces, and the rotor is of the proper diameter so that when assembled the rotor sectors 17 can magnetically bridge across the gaps 14 of the stator when in overlapping position.

It will now be evident that when the stator coil 8 is energized with alternating current, the stator pole pieces 12 and 13 will alternate in magnetic polarity, the poles 12 being south poles when poles 13 are north poles and vice versa, creating a magnetic field which pulsates at a rate proportional to the applied frequency. Thus if the frequency be 60 cycles, the synchronous speed of the 16 pole rotor operating in cooperation with the 16 pole field will be 450 rpm. The polarized rotor, although having eight sectors, is in reality a 16-pole rotor, as the sectors have a pole at each of their two edges. At standstill with the field de-energized, the rotor will, if sufficiently free, seek a position where its sectors 17 bridge gaps between the stator pole pieces because the sectors of the rotor being permanent magnets will move to a position of least reluctance. When the field is energized, it would appear that the rotor might lock, as theoretically the opposing torques of repulsion and attraction can be equal in certain rotor positions. However, such is not the case because of the unbalanced magnetic and mechanical conditions which will always exist. The rotor will vibrate momentarily moving first in one direction and then in the other because of its low inertia and the high magnetic forces active upon it. Therefore, it will jump into synchronous speed almost instantaneously, although the direction of rotation is uncertain unless the rotor is permitted to go in one direction only.

Where a certain direction of rotation is desired, a one-way lock may be provided in the gear reduction unit as represented in Figs. 1 and 2, consisting of a ratchet wheel 22 on one of the driven shafts and a ratchet pawl 23 cooperating therewith to prevent rotation in the counterclockwise direction as viewed in Fig. 2. The pawl is pivoted at 24 and has a tail 25 which approaches the ratchet wheel 22 when the pawl 23 moves away therefrom, and in case the pawl is not in locking position when locking action is called for, the tail 25 will be, or will move the pawl to locking position. This locking device per se is not my invention, and any suitable one-way locking mechanism may be used which will serve the purpose. Thus the motor is self-starting and runs in a given direction at a 16-pole speed. Generally, the gear reduction will be such as to reduce the speed to one rpm at the terminal or output shaft 26.

It will be apparent that due to endwise magnetic attraction between stator and rotor, there will be an end thrust on the ball bearing 20—21. This bearing determines the air gap between stator and rotor and will be designed for minimum wear and long life. The bearing plates 21', which rotatively support the motor rotor shaft 19 and all of the shafts of the gear reduction unit, are preferably made of an oil impregnated metal, such as is sold under the trade name "oilite." The motor and gear reduction unit requires no additional lubrication, and the motor unit is intended to run continuously for several years without attention. The motor has been found to be exceptionally quiet in operation with relatively smooth torque pulsations. This is attributed to the combination of low speed, high torque rotor inertia, and the range of overlapping of the rotor and stator poles during synchronous torque pulsations. It will be observed that the useful torque producing pole face length in the rotor is the radial length of a rotor sector 17 measured from the opening 36 to the periphery multiplied by sixteen, and is roughly double that which would be practicable in a conventional motor of the same diameter where the useful flux gap is across a radial gap at the periphery of the rotor and where the greater portion of the nonperipheral portion of the rotor is used only as a spider supporting structure. In the stator the useful pole face area is even greater in proportion since it is the total stator pole face area adjacent the rotor section. Thus the sector-shaped pole pieces of the stator have a radial length more than three times their mean peripheral width with a correspondingly large useful pole face surface.

The structure or material used in the gear case to the left of the rotor in Fig. 1 should be such as not to provide any appreciable magnetic leakage flux path from the cup shell into the hub section of the rotor such as would rob the motor of useful flux.

Where a shaded pole type of motor is desired, the stator pole piece structure may be formed as in Fig. 4. The stator pole pieces designated 12a and 13a in Fig. 4 correspond to the pole pieces 12 and 13 of Fig. 3 but are provided with axially extending pole faces 27, 28, 29, and 30 formed by turning the edges so as to extend toward the rotor. A copper disk 31 having slots 33 extending to the periphery to accommodate the pole place extensions 27 and 29, and openings 32 to accommodate pole face extensions 28 and 30, is provided. The flux which threads the latter or trailing pole face extensions is thus shaded or retarded by the copper conductor surrounding such extensions, but that which threads the leading pole face extensions 27 and 29 is not shaded. In order to equalize the flux in the unshaded and shaded portions of the stator poles, the shaded pole face extensions 28 and 30 are made slightly longer than the extensions 27 and 29 in an axial direction; hence, the air gap between the shaded pole face extensions and rotor is made correspondingly less than for the unshaded extensions. The shaded pole construction may use a hysteresis steel disk rotor without polar slotting as represented at 34a, Fig. 4. The shaded pole form of motor will not require the one-way locking device 22—23 of Fig. 2, since it will rotate only in the direction of the rotating field produced by the shading poles.

Fig. 5 is intended to show the manner in which the rotor and stator pole pieces overlap and to illustrate the torque action of the form of motor of Fig. 3. In Fig. 5 the stator pole pieces 12 and 13 are shown in full lines and the rotor sectors 17 are represented in dot-dash lines for one particular rotary position taken at random. It is seen here that the peripheral width of a rotor sector 17 is roughly twice the width of the stator pole pieces and the same width as the spacing between stator pole pieces of the same polarity at any given radius. Thus the distances D12, D13 representing the spacing between stator poles 12 and between stator poles 13, respectively, are roughly equal to the width D17 of the rotor sectors 17 all measured at the same radius. Also the spacing between rotor sectors 17 is roughly the width of the stator pole pieces measured at the same radius. Each rotor sector 17 is thus within the influence of at least two stator poles and possibly three stator poles in all rotor positions and is always within the influence of stator poles of opposite magnetic polarity, and each rotor magnetic pole is always within the influence of at least one stator magnetic pole. This liberal range of overlapping is advantageous in quick and powerful starting from any rotor position and in smoothing out the torque pulsations at synchronous speed, resulting in quiet operation.

In Fig. 5 the outer group of stator poles 12 is represented as having an N polarity and the inner group of stator poles as having an S polarity at the instant assumed. The permanent magnetic polarity of the rotor is represented by small $n$ and $s$ polarity designations along the edges of the sectors 17. From the knowledge that like poles repel and unlike poles attract, the torque relations between stator and rotor for this position of the rotor and stator pole polarity will be evident. An outer circle of arrows pointing clockwise represents attraction forces drawn between the edges of the adjacent poles of unlike polarity in stator and rotor. An inner circle of arrows also pointing clockwise represents repulsion torque forces at the points where they occur. The length of these arrows does not necessarily represent relative values but rather the angular location of the torque forces. Thus the arrow marked "Attraction" represents the attraction of south stator pole 13 for the north pole of adjacent rotor sector 17 to the left thereof, and the arrow marked "Repulsion" represents the repulsion force between north stator pole 12 and the north pole of sector 17 adjacent thereto. These forces exist over the radial length of the pole pieces and will obviously tend to produce clockwise rotation as viewed in Fig. 5. If the rotor is blocked for clockwise rotation, the next half-cycle will reverse all of the torques for this rotor position and produce starting and synchronous operation in a counterclockwise direction. There are of course a great variety of rotor positions and stator pole polarity conditions that could be similarly represented but it is believed that the example given will be sufficient to an understanding of the operation of this form of motor.

The operation of the shaded pole hysteresis form of motor of Fig. 4 is essentially the same as in any shaded pole hysteresis motor except for the greatly increased amount of active stator pole piece and rotor area available for torque producing action afforded by the novel construction.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. An electric motor structure comprising cooperating stator and rotor members the stator member having a magnetic circuit provided with an air gap formed between two equally numbered sets of pole pieces, one set extending radially inward and the other set extending radially outward in the same plane perpendicular to the axis of rotation of the motor with the pole pieces of one set interleaved between the pole pieces of the other set, said pole pieces being sector-shaped and of a radial length at least three times their mean peripheral width, a single-phase alternating-current coil for producing a flux in the magnetic circuit such that when the pole pieces of one set are at one polarity the pole pieces of the other set are of the opposite polarity, said pole pieces being uniformly spaced and symmetrically distributed about the axis of rotation, the rotor including a magnetic member mounted for rotation in a radial plane closely adjacent to the radial plane occupied by said pole pieces, the effective air gap between said rotor member and said pole pieces being less than the effective air gap between the pole pieces whereby flux passing between the adjacent stator pole pieces of opposite magnetic polarity does so primarily through said rotor member.

2. An electric motor structure comprising cooperating stator and rotor members said stator member having two sets of magnetic pole pieces equal in number, one set extending radially outward from the axis of rotation of the motor and the other set extending radially inward in the same plane such that the pole pieces of one set extend between the pole pieces of the other set with substantial air gap space between them in said plane, said pole pieces being equally spaced and symmetrically distributed about the axis of motor rotation, means for producing an alternating magnetomotive force between said two sets of pole pieces, said rotor member including a radially slotted disk rotatively mounted closely adjacent to and in axially spaced relation with respect to the stator pole pieces, the rotor slots dividing the rotor into equal sectors equal in number to the stator pole pieces of one set and of approximately half the peripheral width of the stator pole pieces measured at the same radius, said rotor disk being made of permanent magnet material with its sectors similarly polarized in a peripheral direction such that permanent magnet poles of opposite polarity are formed at the two end edges of each sector, the effective air gap between the stator and rotor pole pieces being less than the effective air gap between the stator pole pieces of opposite polarity.

3. An alternating-current motor structure comprising cooperating stator and rotor members, said stator member having a magnetic circuit formed of a cup-shaped member with a central core part therein on the axis of rotation of the motor and with a set of sector-shaped pole pieces extending radially inward from the rim of the cup toward the core and a set of an equal number of sector-shaped pole pieces extending radially outward from the core toward the rim of the cup at the outer end of the core, said pole pieces having a radial length more than twice their mean peripheral width and being symmetrically spaced and interleaved in the same radial plane with sector-shaped gaps between their radial edges, an energizing coil within the cup and about the core for producing a single-phase alternating flux between said pole pieces, said rotor member including a disk-shaped rotor of magnetic material mounted for rotation on the axis of said core in a plane parallel to the plane of the stator pole pieces and closely adjacent to and opposite said pole pieces such that the effective air gap between stator pole pieces and rotor is less than that between stator pole pieces of opposite magnetic polarity whereby the greater portion of the stator flux passing between the pole pieces does so through the rotor and a thrust bearing for said rotor determining the axial air gap spacing between stator and rotor.

4. A synchronous alternating-current motor comprising cooperating stator and rotor members, said stator member having a magnetic circuit formed of a cup-shaped member with a central core therein and with radially extending pole pieces between the core and the cup, there being a set of pole pieces magnetically connected to the cup extending toward the core and an equal number of pole pieces magnetically connected to the core extending toward the wall of the cup, said two groups of pole pieces being equally and symmetrically spaced about the axis of the core with outwardly extending pole pieces between the inwardly extending pole pieces in the same radial plane, said pole pieces being sector-shaped and of such dimensions as to provide a high reluctance air gap between the two sets, an energizing coil within the cup and about the core for producing an alternating flux potential between the sets of pole pieces, a rotor in the form of a disk having radial slots dividing the disk into similar sectors equal in number to one set of stator pole pieces, said rotor being mounted for rotation on the axis of the core in a plane parallel to that of the stator pole pieces and closely adjacent thereto so that its sectors simultaneously overlap stator pole pieces in the two sets, said rotor being made of permanent magnet material with its sectors similarly polarized in a peripheral direction to form poles of opposite magnetic polarity at opposite ends of each sector, said sectors having their end edges symmetrically bent toward the stator pole pieces, and a thrust bearing for said rotor spacing the rotor from the stator pole pieces by an effective air gap less than the air gap between stator pole pieces of the different sets whereby the flux path between different sets of stator pole pieces is through the rotor.

5. An electric motor having two sets of sector-shaped stator pole pieces, both sets extending in a radial direction relative to the axis of rotation of the motor and in the same plane perpendicular to such axis of rotation with the pole pieces of one set spaced from and alternately interleaved with the pole pieces of the other set over a radial distance appreciably greater than the maximum peripheral pole piece width, said pole pieces being equally spaced and symmetrically disposed about the axis of rotation of the motor, means for producing an alternating flux between the pole pieces of the different sets, and a magnetic rotor mounted for rotation in a plane parallel to and closely adjacent the plane of said pole pieces such that it magnetically overlaps stator pole pieces of both sets and comprises the principal path for the alternating flux between said sets of pole pieces and whereby the area of said stator pole pieces facing and overlapped by said rotor is available for producing torque fluxes.

6. A shaded pole alternating-current motor having cooperating stator and rotor members the stator having a magnetic circuit with two equally numbered sets of pole pieces in the same plane perpendicular to the axis of motor rotation the poles of one set extending radially inward between the poles of the other set which extend radially outward symmetrically with respect to such axis, means for producing a single-phase alternating flux between the different sets of pole pieces, a magnetic rotor mounted for rotation on such axis and positioned in a plane parallel to and closely adjacent the plane of the stator pole pieces whereby the rotor overlaps and magnetically bridges the stator pole pieces, the pole pieces of said stator having their radial edges extended toward the rotor, shading pole conductor means surrounding said radial edges of all of said pole pieces only on the trailing sides of said pole pieces, the effective air gap between stator pole pieces and rotor being less than between stator pole pieces of the different sets whereby flux passing between said sets of pole pieces does so through the rotor, and portions thereof from each pole piece are lagged by said conductor means causing a rotational shifting of such flux and corresponding rotation of the rotor.

7. A shaded pole alternating-current motor having cooperating stator and rotor members, the stator having a magnetic circuit formed with a cup-shaped outer part, a core part extending concentrically within the cup from the base thereof and a pole piece assembly between the outer end of the core and inner wall of the cup, a coil within the cup and about the core for producing an alternating flux through the magnetic circuit and pole piece assembly, said pole piece assembly including a plurality of evenly spaced magnetic pole pieces extending inwardly from the cup toward the core and an equal number of evenly spaced magnetic pole pieces extending outwardly from the core symmetrically between the inwardly extending core pieces and in the same plane, a rotor containing magnetic material rotatively mounted on the axis of the cup in a plane parallel and closely adjacent to the plane of said pole pieces, the leading and trailing edges of said pole pieces having projections facing the rotor with the projections on the trailing edges being longer and extending nearer the rotor than the others, and shading coil means on the longer projections, the air gap relations between stator pole pieces and between stator pole piece projections and rotor being such that the greater portion of the flux between the pole pieces passes through the rotor and is approximately evenly divided between the longer and shorter pole piece extensions.

8. A single-phase alternating-current motor structure comprising cooperating stator and rotor members separated by a flux air gap lying in a plane perpendicular to the axis of motor rotation, said stator member having a group of evenly spaced pole pieces of one magnetic polarity facing the air gap in circular formation about the axis of rotation, and a second group, equal in number to the first group, of evenly spaced pole pieces of the opposite magnetic polarity facing the air gap in circular formation about the axis of rotation and lying between and in the same radial plane with the first group of pole pieces, said pole pieces being sector-shaped and being interleaved a radial distance greater than twice the mean peripheral pole piece width, a rotor mounted for rotation about the axis of rotation on the opposite side of the flux air gap from the stator pole pieces having magnetic material adjacent and magnetically bridging the stator pole pieces of opposite magnetic polarity causing the flux between said two groups of pole pieces to cross said air gap and pass through the rotor.

9. A circular motor rotor member for a synchronous motor composed of permanent magnet material and slotted radially so as to divide the peripheral portion thereof into a plurality of equal sectors, said rotor being permanently magnetized in a peripheral direction so as to produce a permanent magnet pole of one polarity at the leading edge of each sector and a permanent magnetic pole of the opposite polarity at the trailing edge of each of said sectors whereby the rotor has twice as many magnetic poles as there are sectors, which poles alternate in polarity about the rotor.

JOHN R. MACINTYRE.